United States Patent
Ikegami et al.

(10) Patent No.: US 6,249,066 B1
(45) Date of Patent: Jun. 19, 2001

(54) STEPPING MOTOR

(75) Inventors: Akihiko Ikegami, Okaya; Yoshikazu Koike, Chino, both of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/468,484

(22) Filed: Dec. 16, 1999

(30) Foreign Application Priority Data

Jan. 6, 1999 (JP) .................................................. 11-001085

(51) Int. Cl.[7] .............................. H02K 37/04; H02K 5/24
(52) U.S. Cl. ........................ 310/49 R; 310/51; 310/216; 310/259
(58) Field of Search ................................ 310/49 A, 49 R, 310/89, 42, 259, 216, 217, 51

(56) References Cited

U.S. PATENT DOCUMENTS 5,386,161 * 1/1995 Sakamoto ............................ 310/49 R
5,945,759 * 8/1999 Tanaka et al. ........................ 310/90
6,057,613 * 5/2000 Trago ................................... 310/49 R

FOREIGN PATENT DOCUMENTS 3041034  6/1997  (JP) .
3054582  9/1998  (JP) .

* cited by examiner

Primary Examiner—Elvin Enad
Assistant Examiner—Judson H. Jones

(57) ABSTRACT

A stepping motor includes a pair of internally fitted members 103a and 103b, one disposed at each end portion of a stator 101 in an axial direction thereof. Each internally fitted member 103a and 103b includes a first fitted portion 102 internally fitted to an inner peripheral surface of the corresponding end portion of the stator 101. The stator 101 is sandwiched in a radial direction thereof by the first fitted portions 102 and second fitted portions 117 of a pair of brackets 106a and 106b, one externally fitted to the outer peripheral surface of each end portion of the stator 101 in the axial direction thereof. The internally fitted members 103a and 103b and the brackets 106a and 106b are separately formed so that the brackets 106a and 106b can be freely positioned with respective to the respective internally fitted members 103a and 103b in a radial direction thereof.

7 Claims, 4 Drawing Sheets

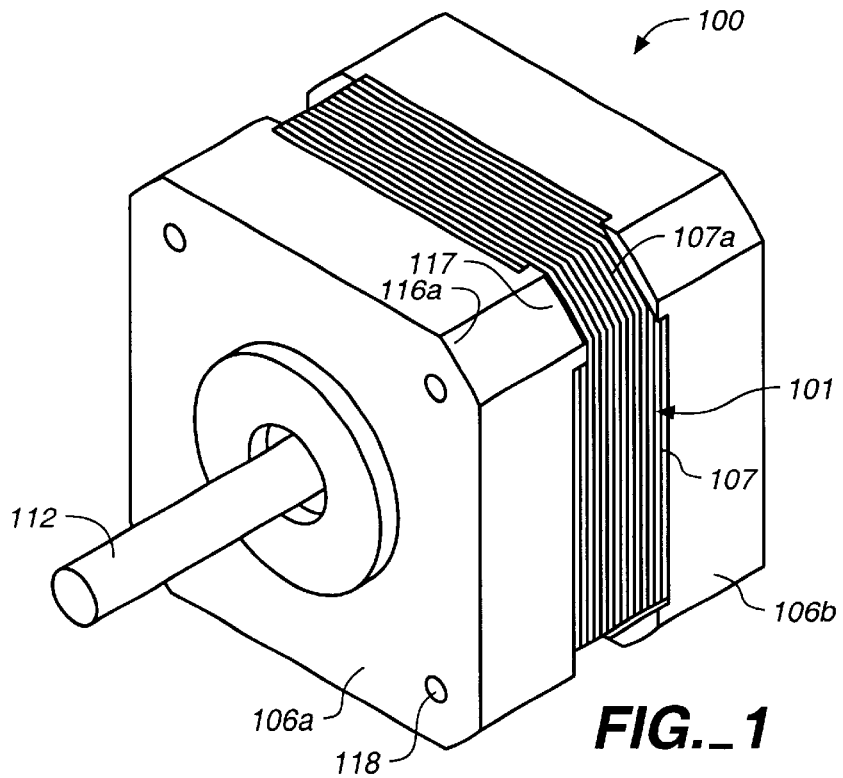
FIG._1
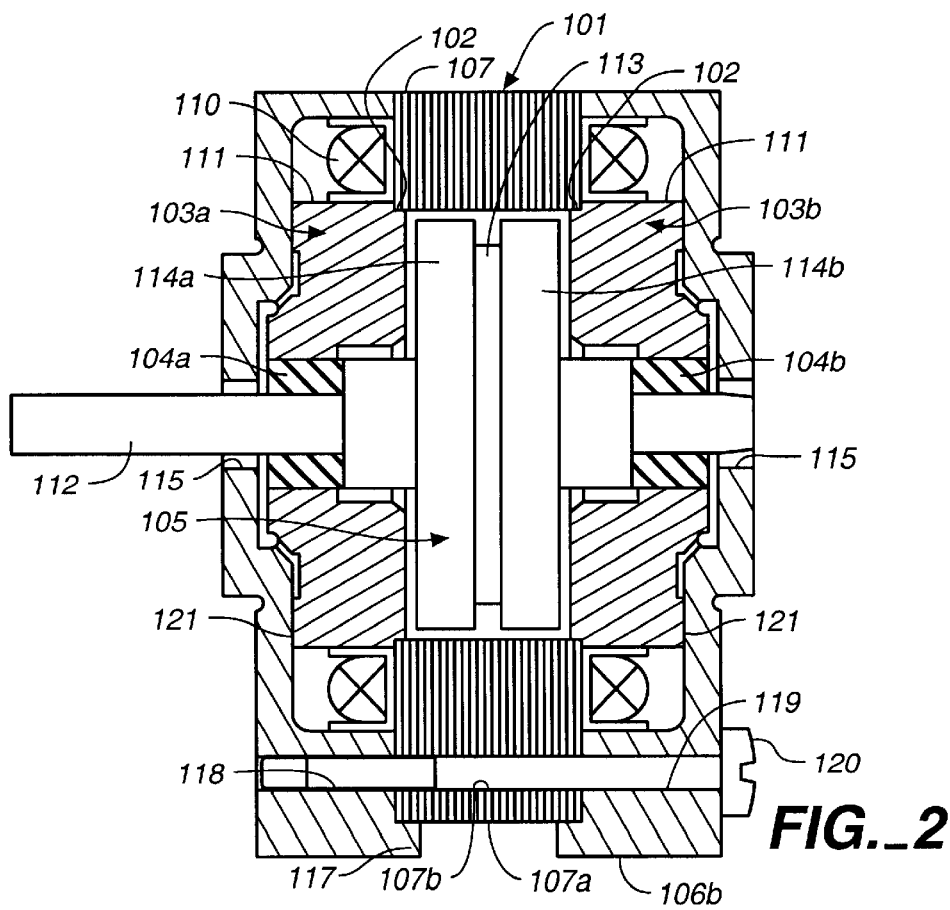
FIG._2

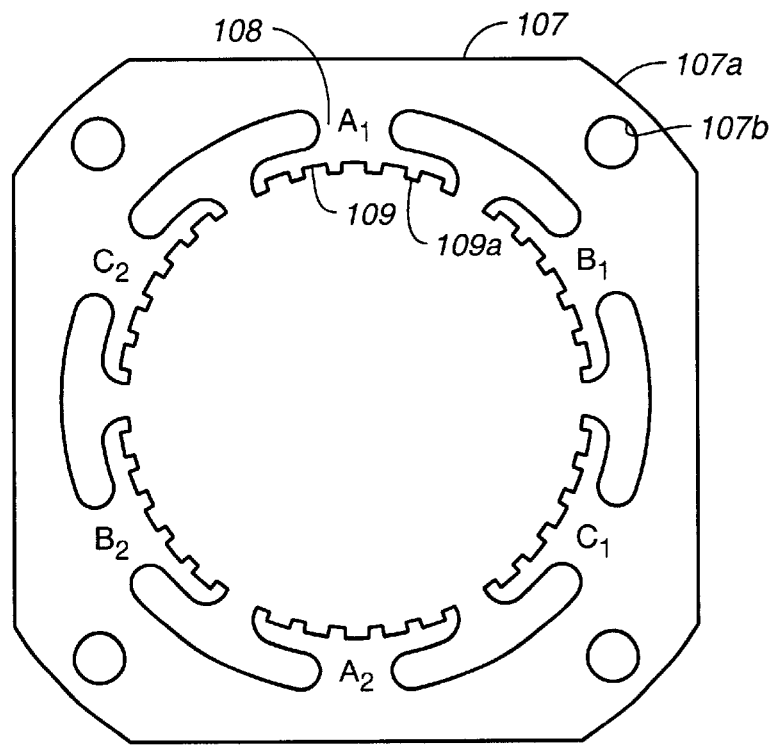
FIG._3
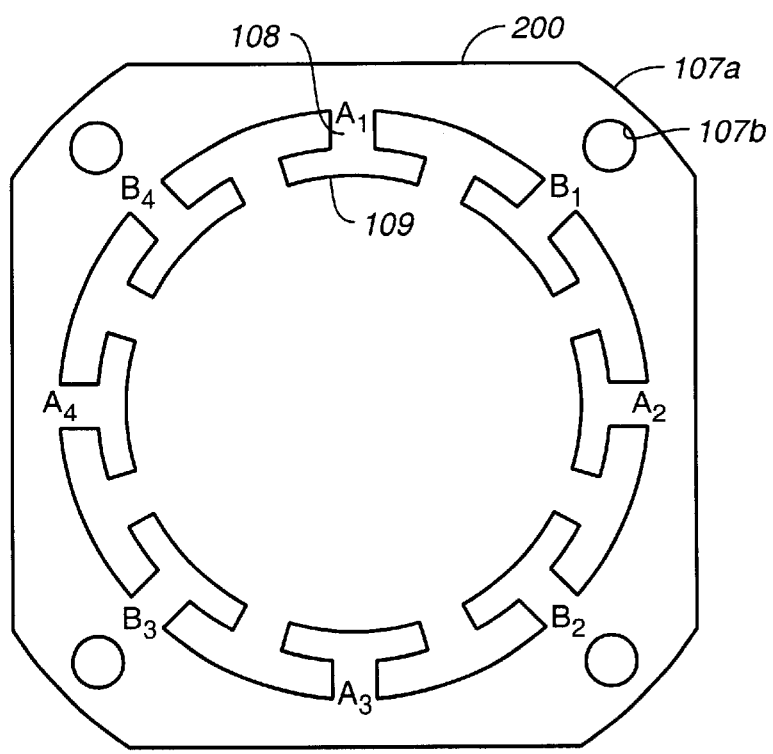
FIG._4

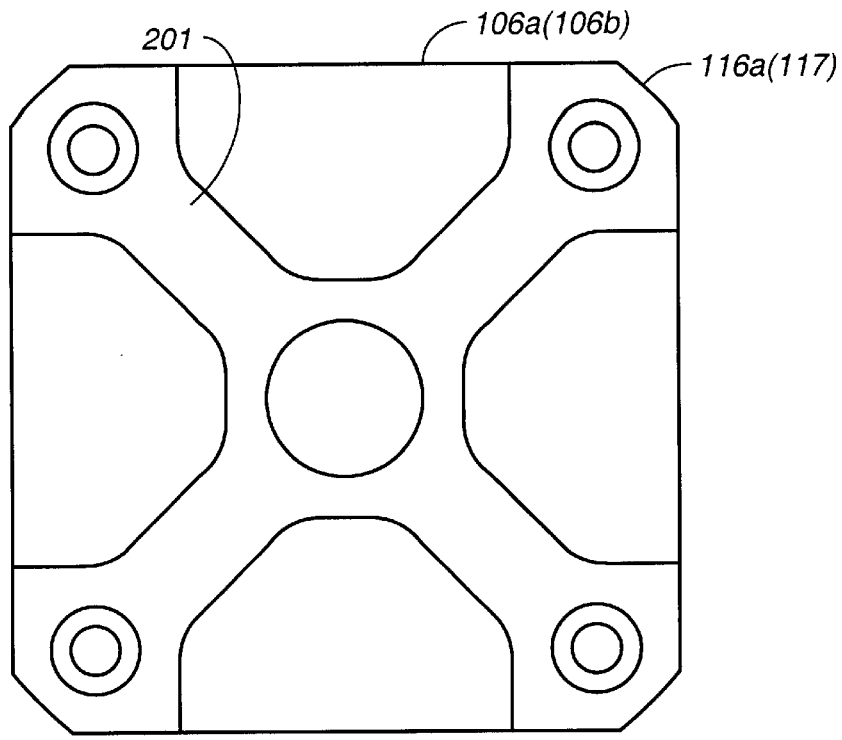
FIG._5
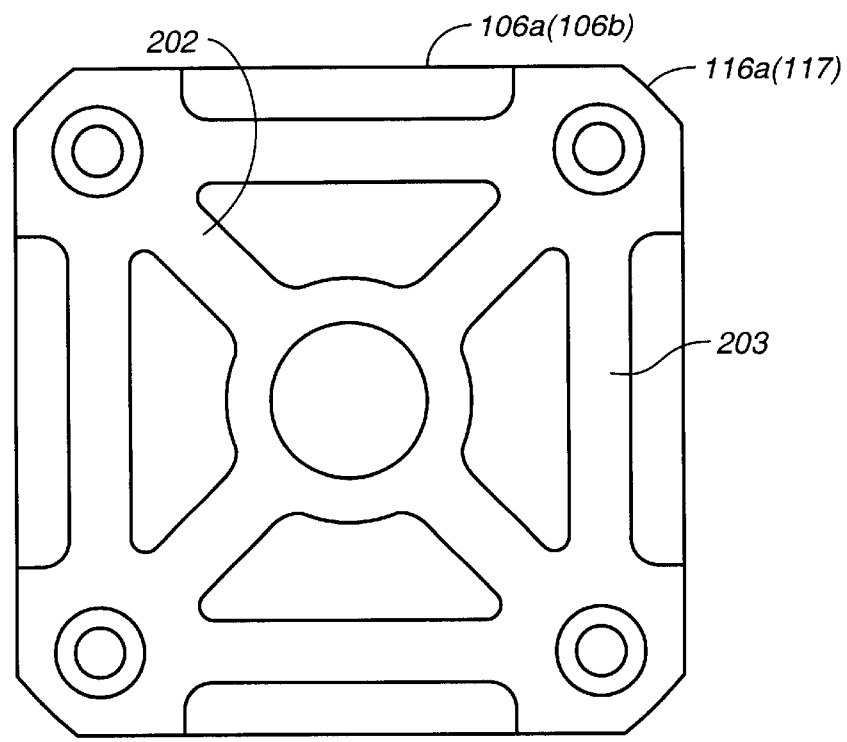
FIG._6

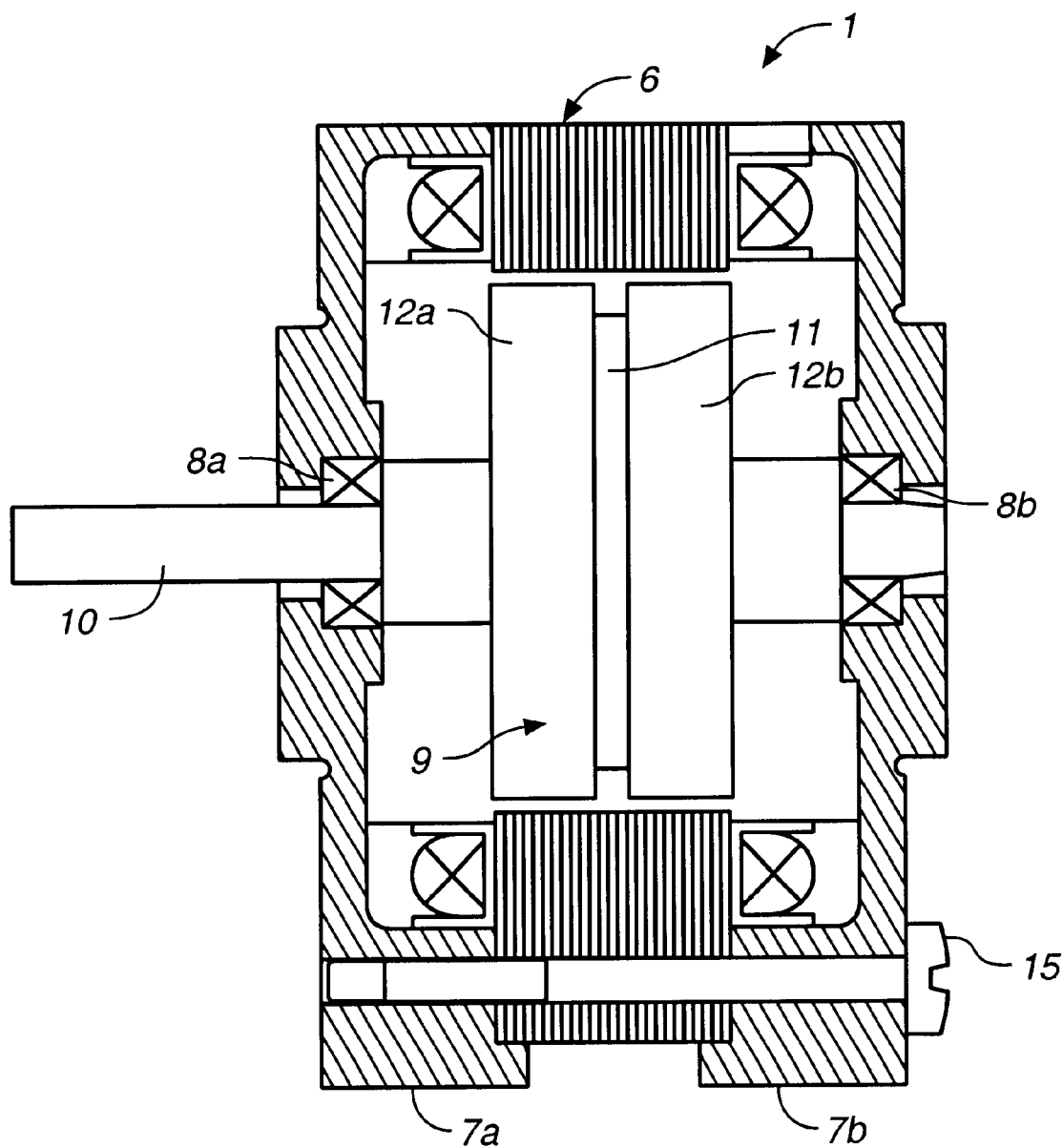
FIG._7
*(PRIOR ART)*

STEPPING MOTOR

BACKGROUND OF THE INVENTION

1. Field of the Invention

The present invention relates to a stepping motor, and, more particularly, to a hybrid-type stepping motor used in, for example, an inkjet printer or a scanner.

2. Description of the Related Art

An example of a known conventional hybrid-type stepping motor is illustrated in FIG. 7.

The stepping motor 1 includes a three-phase six-pole stator 6; a pair of brackets 7a and 7b, one externally fitted to each end portion of the stator 6 in an axial direction thereof; and a rotor 9 inserted in the inner peripheral side of the stator 6 and rotatably supported by the pair of brackets 7a and 7b through bearings 8a and 8b.

The rotor 9 comprises a rotary shaft 10; a disc-shaped permanent magnet 11 secured to the rotary shaft 10; and gear-like rotor cores 12a and 12b, each of which is secured to a corresponding end of the permanent magnet 11 in an axial direction thereof.

The rotor core 12a is separated from the rotor core 12b by half a pitch in a peripheral direction thereof, and is positioned so that a toothed pole (not shown) of the rotor core 12b is disposed between adjacent toothed poles (not shown) of the rotor core 12a. In FIG. 7, reference numeral 15 denotes a bolt for securing the pair of brackets 7a and 7b to the stator 6.

It is well known that hybrid-type stepping motors have a high noise level and vibrate considerably. In reality, however, a technology which allows effective reduction of such noise and vibration has not yet been proposed.

The present inventors have analyzed the causes of noise and vibration in hybrid-type stepping motors. It was found that for a standard hybrid-type stepping motor with an air gap of 50 $\mu$m, when the generated tangent force that turns into torque was 1, the radial attraction/repulsion force (the vibration force) between the stator 6 and the rotor 9 was over 10, while the axial force (the magnetic repulsion force between the stator steel plates) was about 0.1. By suppressing vibration of the stator in a radial direction thereof caused by the radial vibration force, noise and vibration can be effectively reduced.

OBJECTS OF THE INVENTION

Therefore, it is an object of the present invention to overcome the aforementioned problems.

The present invention has been achieved based on this knowledge and has as its object the provision of a stepping motor which makes it possible to reliably and effectively reduce noise and vibration by suppressing vibration of a stator in a radial direction thereof caused by a radial vibration force between a stator and a rotor.

SUMMUARY OF THE INVENTION

To achieve this object according to one aspect of the present invention, the stepping motor comprises a stator including a stator core and a winding, the stator core having a plurality of magnetic poles formed on an inner peripheral portion thereof, at a predetermined interval in a peripheral direction thereof, each magnetic pole including a support and a small-toothed portion, and the winding being placed upon the magnetic poles; a rotor which is inserted in the inner peripheral side of the stator and which is rotatably supported through a pair of bearings; and a pair of brackets, one fitted to each end portion of the stator in an axial direction thereof. The stepping motor further comprises: a pair of internally fitted members, one disposed at each end portion of the stator in the axial direction thereof, each internally fitted member having a first fitted portion internally fitted to an inner peripheral surface of the corresponding end portion of the stator.

The stator is sandwiched in a radial direction thereof by the first fitted portions of the internally fitted members and second fitted portions of the brackets, each second fitted portion being externally fitted to an outer peripheral surface of the corresponding end portion of the stator in the axial direction thereof. The internally fitted members and the brackets are separately formed in order not to limit the freedom with which the brackets are positioned with respect to the internally fitted members in a radial direction thereof.

According to this means, vibration of the stator in a radial direction thereof caused by a vibration force in the radial direction which is about 100 times larger than the axial force can be suppressed from both the inside diameter side and the outside diameter side of the stator, so that noise and vibration can be effectively reduced.

The positioning of the brackets with respect to the outside diameter of the stator, and the positioning of the internally fitted members with respect to the inside diameter of the stator can be performed separately. Therefore, the stator can be sandwiched between the internally fitted members and between the brackets, respectively, with high precision, and thus be reliably sandwiched in the radial direction of the stator from both the inner peripheral surface and the outer peripheral surface thereof.

According to another aspect of the present invention, friction reducing means is provided for reducing friction between the surfaces of the brackets and the surfaces of the internally fitted members that they contact each other in an axial direction thereof According to this means, when the brackets are being mounted, they can be slid with respect to the internally fitted members. Therefore, it is possible to prevent the internally fitted members from limiting the freedom with which the brackets are positioned; to facilitate assembly of the brackets; and to separately sandwich and position the stator from the inner side and outer side thereof.

According to a further aspect of the present invention, a vibration absorbing member is interposed between the surfaces of the brackets and the surfaces of the internally fitted members that contact each other in the axial direction thereof. According to this means, vibration at the side of the internally fitted members and vibration at the side of the brackets do not interfere with each other, so that noise/vibration can be effectively reduced.

According to an additional aspect of the present invention, the pair of brackets are secured to the stator with a bolt, on a line extending from the support of the corresponding magnetic pole of the stator. According to this means, vibration transmitted from the supports in a radial direction thereof can be suppressed at a location where the bolts are secured, so that noise/vibration can be reduced more effectively.

According to yet another aspect of the present invention, the bearing is mounted to the internally fitted members. According to this means, compared to the case where a bearing is supported by brackets, the inside diameter of the stator and the rotary shaft of the rotor can be brought closer to a position where axes coincide, so that a uniform air gap can be formed between the rotor and the stator.

According to yet further aspect of the present invention, a rib for reinforcing the second fitted portions is provided on the pair of brackets. According to this means, the rigidity of the second fitted portions of the brackets is increased, so that the stator can be sandwiched more reliably between the second fitted portions and the first fitted portions of the internally fitted members in a radial direction thereof.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 1 is a perspective view illustrating an embodiment of the hybrid-type stepping motor in accordance with the present invention;

FIG. 2 is a cross-sectional view of the hybrid-type stepping motor;

FIG. 3 is a plan view of a stator core as viewed from an axial direction thereof;

FIG. 4 is a plan view of a modification of the stator core as viewed from the axial direction thereof;

FIG. 5 is a plan view of a modification of the pair of brackets;

FIG. 6 is a plan view of another modification of the pair of brackets; and

FIG. 7 is a cross-sectional view of a conventional hybrid-type stepping motor.

DESCRIPTION OF THE PREFERRED EMBODIMENTS

A description will now be given of an embodiment of the present invention with reference to the drawings.

FIG. 1 is a perspective view illustrating an embodiment of the hybrid-type stepping motor in accordance with the present invention. FIG. 2 is a cross-sectional view of the hybrid-type stepping motor. FIG. 3 is a plan view of the stator core as viewed in an axial direction thereof. FIG. 4 is a plan view of a modification of the stator core as viewed in an axial direction thereof. FIGS. 5 and 6 each shows a modification of the pair of brackets.

Referring to FIGS. 1 to 3, the hybrid-type stepping motor 100 includes a three-phase six-pole stator 101; a pair of internally fitted members 103a and 103b, one fitted to each end portion of the stator 101 in an axial direction thereof; a rotor 105 inserted in an inner peripheral side of the stator 101 and rotatably supported at the internally fitted members 103a and 103b through bearings 104a and 104b; and a pair of brackets 106a and 106b, one fitted to each end portion of the stator 101 in the axial direction thereof.

The stator 101 includes a stator core 107 having an outside shape with a substantially square section. Referring to FIG. 3, on the inner peripheral portion of the stator core 107, six magnetic poles A1, B1, C1, A2, B2, and C2, each of which is formed by a support 108 and a small-toothed portion 109, are provided at an equal interval in a peripheral direction thereof. Each small-toothed portion 109 comprises a plurality of small teeth 109a, and each support 108 is provided at the center portion of its associated small-toothed portion 109 in the peripheral direction thereof, with a winding 110 being placed around the supports 108.

An arc-shaped chamfered portion 107a is formed in each of the four corners of the outer peripheral portion of the stator core 107, and a bolt insertion hole 107b which extends in the axial direction of the stator 101 is formed near its associated arc-shaped chambered portion 107a.

Turning back to FIG. 2, the internally fitted members 103a and 103b are cylindrical members, each including a large-diameter portion 111 whose diameter is slightly larger than the inside diameter of the stator 101, and a small-diameter portion (first fitted portion) 102 whose diameter is about the same as the inside diameter of the stator 101. When the small-diameter portions 102 are internally fitted to the inner peripheral surfaces of the respective end portions of the stator 101 in the axial direction thereof, the small-diameter portions 102 are disposed at the corresponding end portions of the stator 101, respectively, in the axial direction with respect to a common center.

The bearings 104a and 104b which rotatably support a rotary shaft 112 of the rotor 105 are, for example, press-fitted to the inner peripheral portion of the internally fitted members 103a and 103b, respectively.

The rotor 105 comprises the rotary shaft 112; a disc-shaped permanent magnet 113 secured to the rotary shaft 112; and gear-like rotor cores 114a and 114b, each of which is secured to a corresponding end of the permanent magnet 113 in an axial direction thereof The permanent magnet 113 and the rotor cores 114a and 114b are positioned between the internally fitted members 103a and 103b; are disposed in the inner peripheral side of the stator 101; and are separated from the stator 101 by a very small air gap with a size of about 50 μm to 100 μm.

The rotor core 114a is separated from the rotor core 114b by half a pitch in a peripheral direction thereof, so that a toothed pole (not shown) of the rotor core 114b is positioned between adjacent toothed poles (not shown) of the rotor core 114a.

The brackets 106a and 106b each have a bottom and a square cylindrical outside shape, which is virtually the same as the shape of the stator 101. An insertion hole 115 for inserting the rotary shaft 112 of the rotor 105 therein is formed in the center portion of the bottom wall of each of the brackets 106a and 106b. As shown in FIG. 1, a chamfered portion 116a is formed in each of the four corners of the outer peripheral portion of each of the brackets 106a and 106b, in correspondence with its associated chamfered portion 107a of the stator 101.

Fitted protrusions (second fitted portions) 117 externally fitted to their respective chamfered portions 107a of the stator 101 are provided at their respective chamfered portions 116a of the bracket 106a and the bracket 106b so as to extend in the axial direction of the stator 101. The stator 101 is provided so as to be sandwiched between the fitted protrusions 117 and the small-diameter portions 102 of the internally fitted members 103a and 103b in a radial direction thereof.

At the four corners of the bottom wall of the bracket 106a, threaded holes 118 are formed concentrically with their respective bolt insertion holes 107b formed in the stator core 107. At the four corners of the bottom wall of the bracket 106b, bolt insertion holes 119 are formed concentrically with their respective bolt insertion holes 107b. By screwing securing bolts 120, inserted in their respective bolt insertion holes 119 and their respective bolt insertion holes 107b, into their respective threaded holes 118, the brackets 106a and 106b are secured to the stator 101.

When the brackets 106a and 106b are secured to the stator 101, a stator 101 side end surface of the large-diameter portion 111 of each of the internally fitted members 103a and 103b contact a side surface of the stator 101, and a peripheral edge portion of an end surface of each of the internally fitted members 103a and 103b facing away from the stator 101 contacts the bottom wall of each of the brackets 106a and 106b. A friction reducing material such as, for example, a fluoroplastic coating (friction reducing means) 121 or the like is applied to the surfaces of the internally fitted member 103a and the bracket 106a that contact each other and to the surfaces of the internally fitted member 103b and the bracket 106b that contact each other, in order to reduce friction between these component parts.

As can be understood from the foregoing description, in the embodiment, since the fitted protrusions 117 of the brackets 106a and 106b and the small-diameter portions 102 of the internally fitted members 103a and 103b are provided so as to sandwich the stator 101 in a radial direction thereof, vibration of the stator 101 in the radial direction thereof caused by vibration force in the radial direction that is about 100 times the axial force can be suppressed from both the inside diameter side and the outside diameter side of the stator 101. As a result, noise and vibration can be effectively reduced.

A test was conducted on the stepping motor of the embodiment and the stepping motor of FIG. 7 having the conventional structure. The stepping motor of the embodiment and the conventional stepping motor of FIG. 7 were rotated at a speed of 1020 rpm, and the level of the noise generated from these stepping motors was measured at a distance of 10 cm from these stepping motors. The results are given in Table 1. According to Table 1, when the structure of the stepping motor of the embodiment is used, the noise level can be significantly reduced, regardless of whether the stepping motor is used alone or is mounted in a printer to feed sheets.

TABLE 1

|  | Conventional Type dB (A) | New Type of Structure 1 dB (A) | New Type of Structure 2 dB (A) |
| --- | --- | --- | --- |
| Stepping Motor Used Alone | 43.5 | 39.6 | 39.6 |
| Stepping Motor Mounted in Printer for Feeding Sheets | 59.7 | 56.3 | 56.0 |

The brackets 106a and 106b and the internally fitted members 103a and 103b are separately formed so that the brackets 106a and 106b can be freely positioned in a radial direction thereof with respect to the internally fitted members 103a and 103b, respectively. Therefore, the positioning of the brackets 106a and 106b with respect to the outside diameter of the stator 101 and the positioning of the internally fitted members 103a and 103b with respect to the inside diameter of the stator 101 can be performed separately. As a result, the stator 101 can be precisely sandwiched between the internally fitted members 103a and 103b, and between the brackets 106a and 106b, respectively, with high precision, making it possible to reliably sandwich the stator 101 in the radial direction thereof from both the inner peripheral surface and the outer peripheral surface thereof.

A fluoroplastic coating 121 or the like is applied to the surfaces of the internally fitted member 103a and the bracket 106a that contact each other and to the surfaces of the internally fitted member 103b and the bracket 106b that contact each other, in order to reduce friction between these component parts. Therefore, when the brackets 106a and 106b are being mounted, they can be slid with respect to their respective internally fitted members 103a and 103b. As a result, it is possible to prevent the internally fitted members 103a and 103b from limiting the freedom with which the brackets 106a and 106b can be positioned. This makes it possible to facilitate assembly of the brackets 106a and 106b, and to separately sandwich and position the stator 101 from the inner side and the outer side thereof.

The bearings 104a and 104b which support the rotary shaft 112 of the rotor 105 are directly supported by the internally fitted members 103a and 103b fitted to the inside diameter of the stator 101. Therefore, compared to the case where the bearings 104a and 104b are supported by the brackets 106a and 106b, the inside diameter of the stator 101 and the rotary shaft 112 of the rotor 105 can be brought closer to a position where axes coincide. As a result, a uniform air gap can be formed between the rotor 105 and the stator 101.

Although in the above-described embodiment a fluoroplastic coating 121 was used as means for reducing friction at the surfaces of the internally fitted member 103a and the bracket 106a that contact each other and at the surfaces of the internally fitted member 103b and the bracket 106b that contact each other, the present invention is not limited thereto. In order to reduce friction, the contact surfaces may be subjected to surface treatment so as to reduce the area of contact of the contact surfaces.

In place of the friction reducing means or in addition to the friction reducing means, vibration absorbing members (not shown) such as resilient members or low resiliency rubbers may be interposed between the surfaces of the internally fitted member 103a and the bracket 106a that contact each other and between the surfaces of the internally fitted member 103b and the bracket 106b that contact each other.

When this is done, it is possible to prevent vibration at the side of the internally fitted members 103a and 103b and vibration at the side of the brackets 106a and 106b from interfering with each other. Therefore, noise/vibration can be reduced more effectively, and the securing bolts 120 can be prevented from loosing due to the resiliency of the vibration absorbing members.

Although in the above-described embodiment a hybrid-type stepping motor with a three-phase six-pole stator 101 was used, it is obvious that the present invention may also be applied to, for example, a hybrid-type stepping motor with a two-phase eight-pole stator illustrated in FIG. 4 or to other types of generally used hybrid-type stepping motors, regardless of the number of phases and number of poles.

In the stator core 200 of the stator of FIG. 4, the insertion holes 107b for inserting their respective securing bolts 120 therein are disposed on respective lines extending from the supports 108 of their respective magnetic poles B1, B2, B3, and B4 in a radial direction thereof. Therefore, vibration transmitted from the supports 108 in a radial direction thereof can be suppressed at the location where the securing bolts 120 are secured. As a result, it is possible to reduce noise/vibration more effectively.

As shown in FIG. 5, when the fitted protrusions 117 formed at the four corners of the bracket 106a and the four corners of the bracket 106b are connected by diagonal, line-like ribs 201, or as shown in FIG. 6, when the fitted protrusions 117 formed at the four corners of the bracket 106a and the four corners of the bracket 106b are connected by diagonal, line-like ribs 202 as well as by ribs 203 in a peripheral direction thereof, the rigidity of each of the fitted protrusions 117 is increased. This allows more reliable sandwiching of the stator 101 in a radial direction thereof between the fitted protrusions 117 of the bracket 106a and the fitted protrusions 117 of the bracket 106b and the small diameter portion 102 of the internally fitted member 103a and the small-diameter portion 102 of the internally fitted member 103b.

As is clear from the foregoing description, according to the present invention, by suppressing vibration of the stator in a radial direction thereof produced by a radial vibration force between the stator and the rotor, a stepping motor which makes it possible to reduce noise and vibration reliably and effectively can be provided.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

REFERENCE NUMERALS

100 . . . Hybrid-type stepping motor
101 . . . Stator
102 . . . Small-diameter portion (first fitted portion)
103a, 103b . . . Internally fitted members
104a, 104b . . . Bearings
105 . . . Rotor
106a, 106b . . . Brackets
107 . . . Stator core
108 . . . Support
109 . . . Small-toothed portion
110 . . . Winding
112 . . . Rotary shaft
113 . . . Permanent magnet
114a, 114b . . . Rotor cores
117 . . . Fitted protrusion (second fitted portion)
120 . . . Securing bolt
121 . . . Fluororesin coating (friction reducing means)
201, 202, 203 . . . Ribs

What is claimed is:
1. A stepping motor comprising:
a stator having a stator core and a winding;
a pair of bearings;
a rotor arranged in an inner peripheral side of said stator and rotatably supported through said pair of bearings; and
a pair of brackets, each of said pair of brackets fitted to a respective end portion of said stator in an axial direction thereof;
a pair of internally fitted members, each of said pair of internally fitted members disposed at a corresponding end portion of said stator in the axial direction thereof, each of said pair of internally fitted members having a first fitted portion internally fitted to an inner peripheral surface of the corresponding end portion of said stator;
wherein said stator is sandwiched in a radial direction thereof by the first fitted portions of said pair of internally fitted members and second fitted portions of said pair of brackets, each of the second fitted portions being externally fitted to an outer peripheral surface of the corresponding end portion of said stator in the axial direction thereof; and
wherein said pair of internally fitted members and said pair of brackets are separately formed so that said pair of brackets are freely positioned with respect to said pair internally fitted members in a radial direction thereof.

2. A stepping motor according to claim 1, wherein said stator core comprises a plurality of magnetic poles disposed on an inner peripheral portion thereof and at a predetermined interval in a peripheral direction thereof,
wherein each of said plurality of magnetic poles has a support and a small-toothed portion, and
wherein said winding is disposed upon said plurality of magnetic poles.

3. A stepping motor according to claim 1, wherein said stepping motor further comprises a vibration absorbing member interposed between the surfaces of said pair of brackets and the corresponding surfaces of said pair of internally fitted members which contact each other in the axial direction thereof.

4. A stepping motor according to claim 2, wherein said pair of brackets are secured to said stator with bolts, arranged in a direction extending from a support of a corresponding one of said plurality of magnetic poles.

5. A stepping motor according to claims 1, wherein said bearing is mounted to said pair of internally fitted members.

6. A stepping motor comprising:
a stator having a stator core and a winding;
a pair of bearings;
a rotor arranged in an inner peripheral side of said stator and rotatably supported through said pair of bearings; and
a pair of brackets, each of said pair of brackets fitted to a respective end portion of said stator in an axial direction thereof;
a pair of internally fitted members, each of said pair of internally fitted members disposed at a corresponding end portion of said stator in the axial direction thereof, each of said pair of internally fitted members having a first fitted portion internally fitted to an inner peripheral surface of the corresponding end portion of said stator;
wherein said stator is sandwiched in a radial direction thereof by the first fitted portions of said pair of internally fitted members and second fitted portions of said pair of brackets, each of the second fitted portions being externally fitted to an outer peripheral surface of the corresponding end portion of said stator in the axial direction thereof;
wherein said pair of internally fitted members and said pair of brackets are separately formed so that said pair of brackets are freely positioned with respect to said pair internally fitted members in a radial direction thereof; and
a friction reducing material to reduce friction between surfaces of said pair of brackets and corresponding surfaces of said pair of internally fitted members which contact each other in the axial direction thereof.

7. A stepping motor comprising:
a stator having a stator core and a winding;
a pair of bearings;
a rotor arranged in an inner peripheral side of said stator and rotatably supported through said pair of bearings; and a pair of brackets, each of said pair of brackets fitted to a respective end portion of said stator in an axial direction thereof;

a pair of internally fitted members, each of said pair of internally fitted members disposed at a corresponding end portion of said stator in the axial direction thereof, each of said pair of internally fitted members having a first fitted portion internally fitted to an inner peripheral surface of the corresponding end portion of said stator;

wherein said stator is sandwiched in a radial direction thereof by the first fitted portions of said pair of internally fitted members and second fitted portions of said pair of brackets, each of the second fitted portions being externally fitted to an outer peripheral surface of the corresponding end portion of said stator in the axial direction thereof;

wherein said pair of internally fitted members and said pair of brackets are separately formed so that said pair of brackets are freely positioned with respect to said pair internally fitted members in a radial direction thereof; and wherein said pair of brackets comprises a rib for reinforcing the second fitted portions.

\* \* \* \* \*